United States Patent [19]

Gerhardt et al.

[11] Patent Number: 4,457,683

[45] Date of Patent: Jul. 3, 1984

[54] BELT-TYPE PRESS

[75] Inventors: Klaus Gerhardt, Rheurdt; Dieter Goerty, Viersen, both of Fed. Rep. of Germany

[73] Assignee: G. Siempelkamp GmbH & Co., Krefeld, Fed. Rep. of Germany

[21] Appl. No.: 471,516

[22] Filed: Mar. 2, 1983

[30] Foreign Application Priority Data

Mar. 3, 1982 [DE] Fed. Rep. of Germany ....... 3207627

[51] Int. Cl.$^3$ ....... B29J 5/00

[52] U.S. Cl. ....... 425/373

[58] Field of Search ....... 425/373

[56] References Cited

U.S. PATENT DOCUMENTS

| | | | |
|---|---|---|---|
| 3,891,376 | 6/1975 | Gersbeck et al. | 425/373 |
| 3,938,927 | 2/1976 | Brinkmann et al. | 425/373 |
| 4,177,725 | 12/1979 | Gersbeck | 425/373 |

*Primary Examiner*—James R. Hall

*Attorney, Agent, or Firm*—Karl F. Ross; Herbert Dubno

[57] ABSTRACT

A press comprises a drum having a heated outer surface and rotatable about an axis and at least one endless belt radially juxtaposed with a portion of the outer drum surface and consisting mainly of an elastically deformable matrix and a plurality of parallel, twisted, and generally annular multifilament cords axially spaced from one another and formed of yarns of an aromatic polyamide imbedded in the matrix. The belt is tensioned and thereby urged radially toward the drum-surface portion. Thus the belt and the drum-surface portion form an angularly extending pressing region. A web to be compressed is fed tangentially to one end of the pressing region and is withdrawn it from the other end thereof. A drive rotates the drum and thereby displaces the web and the belt angularly along the portion so that the web is compressed against and heated by the drum. The cords according to this invention are formed as cables.

16 Claims, 10 Drawing Figures

BELT-TYPE PRESS

FIELD OF THE INVENTION

The present invention relates to a press for making laminates, particleboard, and the like. More particularly this invention concerns such a press wherein the pressing takes place in an arcuate region formed between a rotating drum and a belt urged against it.

BACKGROUND OF THE INVENTION

Particleboard, which includes chipboard and fiberboard, is made from a mat of particles formed in the manner, for instance, described in U.S. Pat. Nos. 4,308,227, 4,341,135, and 4,315,722 of Dec. 29, 1981, July 27, 1982, and Feb. 16, 1982, respectively. The mat formed by such an arrangement is prepressed so it has modest dimensional stability, but must be pressed again, normally while heating it and under considerable pressure to produce rigid particleboard. The mat-forming equipment operates continuously, so it is necessary to use a continuously operating press that lies in the production line immediately downstream of the mat-forming station and immediately upstream of the finishing and trimming station.

Such a press can be of the platen type as described in commonly owned patent application Ser. No. 411,109 filed Aug. 24, 1982 by K. Gerhard, having upper and lower vertically spaced press platens confronting each other and forming a straight horizontal path that can be well over 1O m long. Respective upper and lower belts have confronting parallel stretches lying between the platens and flanking the path. Thus the belts are driven to move the mass of particles to be pressed along the path from an upstream end to a downstream end thereof. Press frames traversed by the platens and belt stretches bear vertically on one of the platens, normally supporting the lower platen. Heavy-duty hydraulic actuators are engaged between each frame and the other platen, normally the upper platen. The press frame is constituted as a plurality of frames traversed by the platens and belt stretches and formed as a single sheet-steel element at and adjacent the downstream end and as a group of substantially identical such elements at and adjacent the upstream end. A plurality of substantially identical hydraulic actuators are engaged between each frame and the other platen. The number of actuators per frame increases from the downstream end toward the upstream end. Thus the pressure exerted against the other platen is substantially greater at the upstream end than at the downstream end. These actuators are upright simple hydraulic rams and are all pressurized at the same pressure.

It is also known to use a belt-type arrangement provided with a drum having a heated outer surface and rotatable about an axis and at least one endless belt radially juxtaposed with a portion of the outer drum surface. Means is provided for tensioning the belt and thereby urging it radially toward the drum-surface portion so that the belt and the drum-surface portion form an angularly extending pressing region. The web to be compressed is fed tangentially to one end of the pressing region and is withdrawn from the other end thereof. In addition the drum is rotated to displace the web and the belt angularly along the portion so that the web is compressed against and heated by the drum.

In a standard such belt-type press used for making resin-impregnated paper or textile or for otherwise finishing hard laminates the belt is formed of flexible steel so that suffucient tension can be employed to provide the considerable compression—at least 1O $kp/cm^2$—needed to make laminates of resin-impregnated paper, to plastic-coat textile webs, or to finish particleboard or plywood. The steel belt is bent around the drum so that the tension in it is effective radially inward on the workpiece also partially wrapped around the drum.

In order that the belt be flexible enough to conform to the drum it must have a thickness which at most is one five-hundredth the minimum radius of curvature that the belt must conform to, which dimension normally is one-thousandth the drum diameter. With a modulus of elasticity of $2.1.10^6$ $kp/cm^2$ the bending tension is 2,100 $kp/cm^2$. A high-quality steel belt can therefore be operated with an overall tension of between 3,000 $kp/cm^2$ and 4,500 $kp/cm^2$. Thus even with a relatively high tension of 4,100 $kp/cm^2$ only 2,000 $kp/cm^2$ is effective for pressing, since 2,100 $kp/cm^2$ of the force serves to bend the steel belt. As a result the considerable tension that a steel belt can be subjected to is largely wasted just bending it around the drum.

Accordingly German patent document No. 2,856,646 has proposed replacing the steel belt with one formed as a matrix of an elastomer in which reinforcement is imbedded. The reinforcement is steel cable and the matrix is a butyl rubber vulcanized to it. A silicon-rubber layer is fixed to the outer surfaces to make this belt hard. Such a belt is much more flexible than the above-described all-steel belt. Nonetheless its service life is very short at the high tensions necessary so it has not met with widespread use.

OBJECTS OF THE INVENTION

It is therefore an object of the present invention to provide an improved belt-type press.

Another object is the provision of such a belt-type press which overcomes the above-given disadvantages.

A further object is to provide such a press which can compress a continuously moving web with a pressure of at least 1O $kp/cm^2$.

SUMMARY OF THE INVENTION

These objects are attained according to the instant invention in a press which comprises a drum having a heated outer surface and rotatable about an axis and at least one endless belt radially juxtaposed with a portion of the outer drum surface and consisting mainly of an elastically deformable matrix and a plurality of parallel, twisted, and generally annular multifilament cords axially spaced from one another and formed of yarns of an aromatic polyamide imbedded in the matrix. Means is provided for tensioning the belt and thereby urging it radially toward the drum-surface portion. Thus the belt and the drum-surface portion form an angularly extending pressing region. In addition means is provided for feeding the web to be compressed tangentially to one end of the pressing region and for withdrawing it from the other end thereof. Drive means rotates the drum and thereby displaces the web and the belt angularly along the portion so that the web is compressed against and heated by the drum.

The cords according to this invention are formed as cables.

The term yarn here is intended to cover a strand formed of a plurality of filaments which can themselves be constituted as monofilaments, multifilaments, or even staple fibers. The cord can be formed of a core itself constituted as one or more multifilament wires, an outer layer constituted as a plurality of multifilament wires, and an intermediate layer also constituted of multifilament wires. The outer layer and core are both stabilized by means of an appropriate rubber or synthetic-resin binder, but the intermediate layer is not. Thus the cord can bend readily but still remains very strong.

It is also within the scope of this invention to form the cable as described above, but using yarns instead of the wires. These yarns are staple yarns having a twist of about 40 turns per meter. The cables have a twist of about 15 turns per meter. The cords can also be standard multifilament yarns.

In any case according to this invention all the yarns have the same twist and all the cords also do, with the cords parallel next to one another.

According to another feature of this invention the cords are generally of rectangular section and lie immediately adjacent one another. Thus they can exert considerable pressing force.

In addition according to the invention the yarns are formed of Kevlar, a textile resin marketed by DuPont.

In accordance with another feature according to the invention the cords are substantially straight and smooth and the belt further comprises connecting filaments tranverse to the cords and imbedded in the matrix.

The cords according to this invention can be separate and endless. They also may be formed by the turns of a single strand wound many times within the belt. Several layers of such cords can be imbedded in the matrix.

To maximize belt life it has faces provided with textile coverings that resist transverse deformation. In addition it has reinforced edges and is of greater rigidity at the edges than therebetween.

With the system of this invention it is possible easily to obtain the very high pressures to make resin-impregnated papers or laminate webs or to finish plywood or particleboard. The belt can be counted on to have an extremely long service life since the forces do not work againt one another in the reinforcement cords, that is differentially between the individual filaments that form the yarns. The use of twisted yarns ensures that the forces are evenly distributed in the yarn and thus the pressing forces are assumed by the whole structure. When a movement-compensating intermediate layer is used in the cables it is possible for the belt to be tensioned very greatly.

DESCRIPTION OF THE DRAWING

The above and other features and advantages will become more readily apparent from the following, reference being made to the accompanying drawing in which.

SPECIFIC DESCRIPTION

Figure 1:
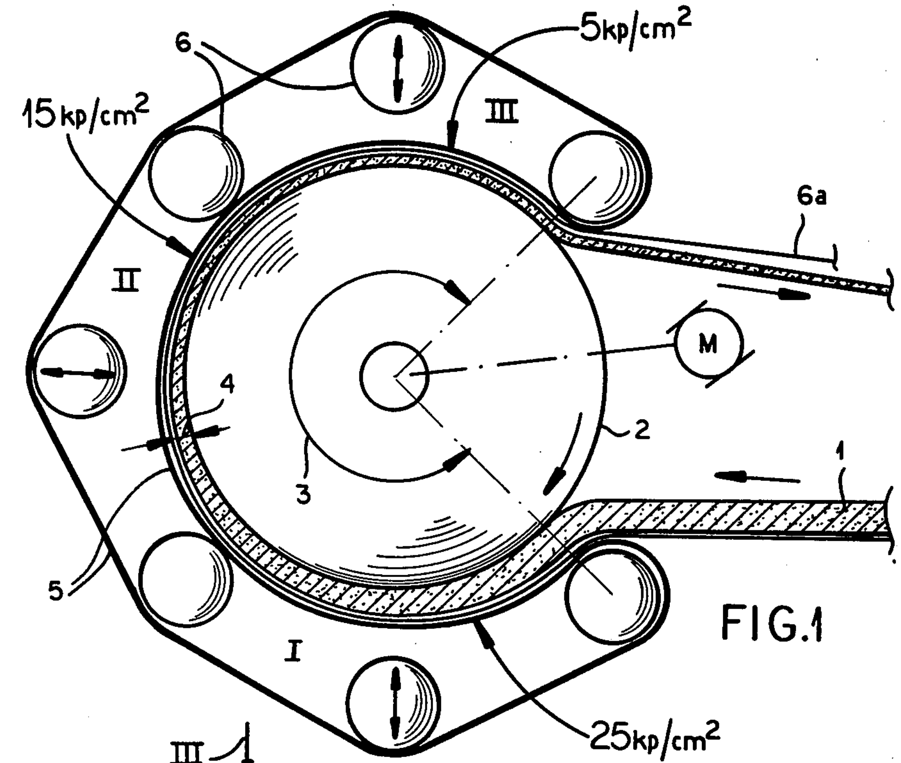
FIG. 1 is a side view of a press according to the invention.

As seen in FIG. 1 a workpiece 1 which may be a prepressed mat of particles, a laminate, a resin-impregnated paper web, or the like is fed on a support web 6a to one end of a pressing gap 4 defined between a cylindrical drum 2 centered in an axis A and rotated thereabout by a motor M and an annular belt 5 spanned over rollers 6. The pressing gap 4 narrows in the clockwise direction and extends over 270°. The web 6a can be of needle felt, a synthetic resin, or metal.

The pressure is initially quite high—some 25 $kp/cm^2$—in a zone I, then drops in a zone II to 15 $kp/cm^2$, and ends up in a zone III rather low—5 $kp/cm^2$. Normally the belt 5 is driven by frictional engagement through the workpiece 1 and web 6a from the driven heated drum 2, although an opposite drive arrangement is possible as is independent but synchronous driving of both elements 2 and 5.

Figure 2:
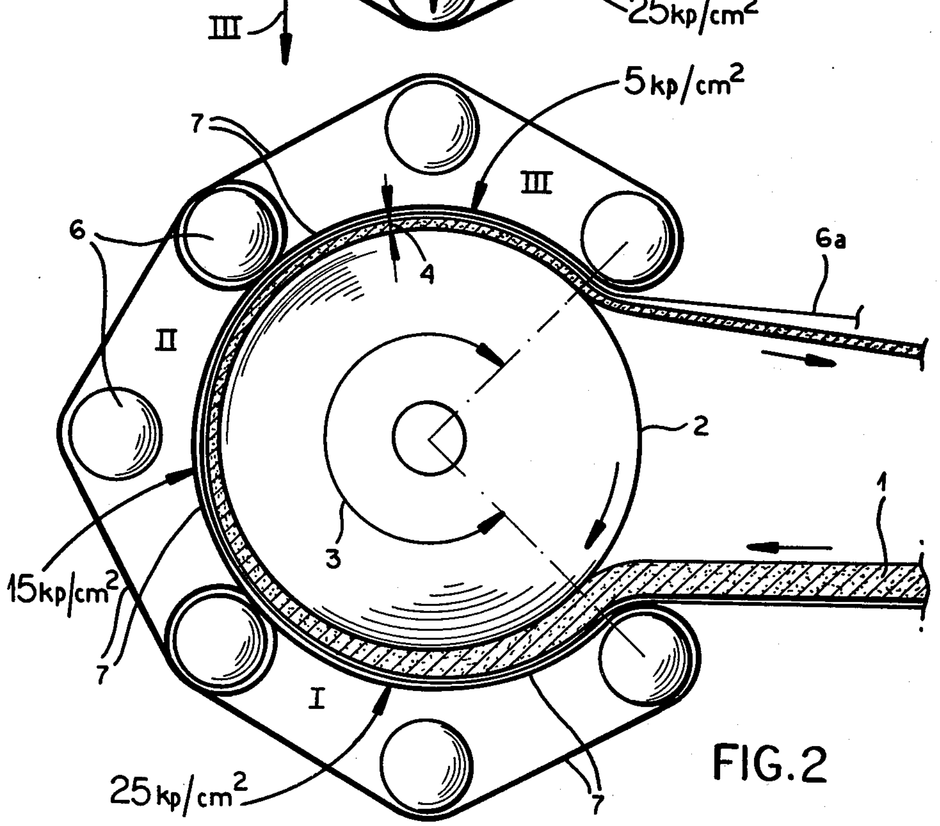
FIG. 2 is a side view like FIG. 1 of another press in accordance with this invention.
Figure 3:
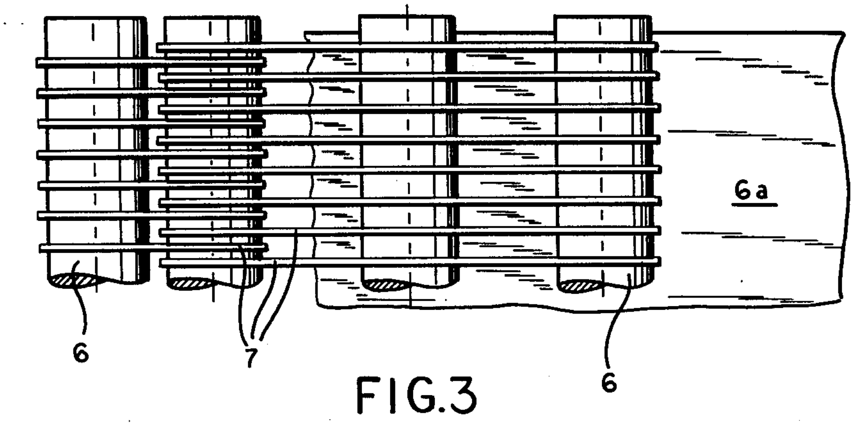
FIG. 3 is a top view taken in the direction of arrow III of FIG. 2.
Figure 4:
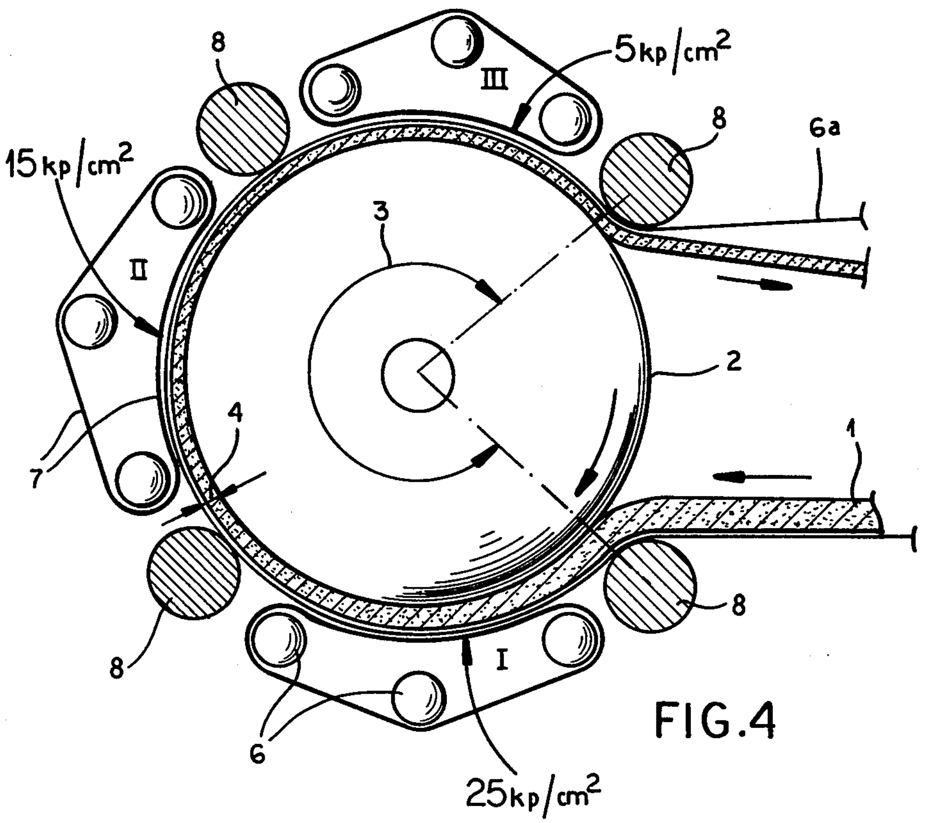
FIGS. 4 and 5 are side views like FIG. 1 of further presses in accordance with this invention.
Figure 5:
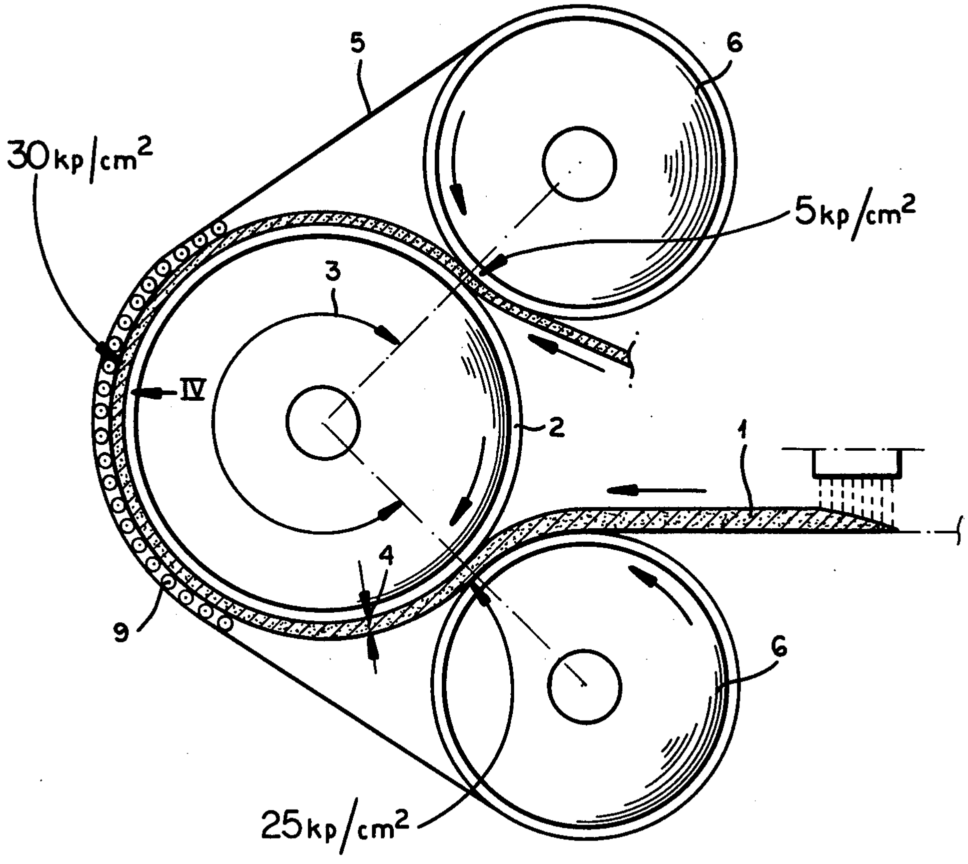

In FIGS. 2 and 3 several sets of annular cords 7 replace the single belt 5, making it easier to create the different pressures in the zones. In FIG. 4 calibrating rollers 8 are provided to each side of each zone I, II, and III. The arrangement of FIG. 5 uses force-transmitting rollers 9 in a region IV so that here both stretches of the belt 5 can bear on the drum 2, thereby doubling the radially inwardly effective force.

According to this invention the belt 5 has a thickness which is substantially greater than that of a standard sheet-steel belt. The stretch of the material used for the belt 5 in accordance with the invention is only slightly greater in its outside face when it is bent than in its inside face. The differences are such that more than 90% of the tension in the belt is transformed into pressing force. Thus if one is operating with a roller 2 having a diameter of 1.3 m and a belt 5 having a thickness of 3.5 mm and a stretch of 1% when tensioned at 1.75 t per cm of band width and a tension of about 4 t per cm of band width, there will be in the gap 4 a pressing force of 50 $kp/cm^2$. Thus practically none of the tension is wasted in bending the belt.

Figure 6:
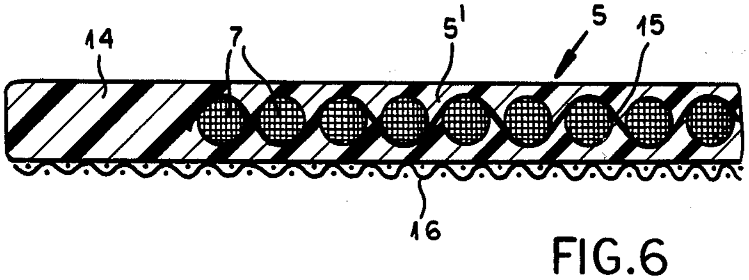
FIG. 6 is a large-scale cross section through a portion of a press belt according to the invention.
Figure 7:
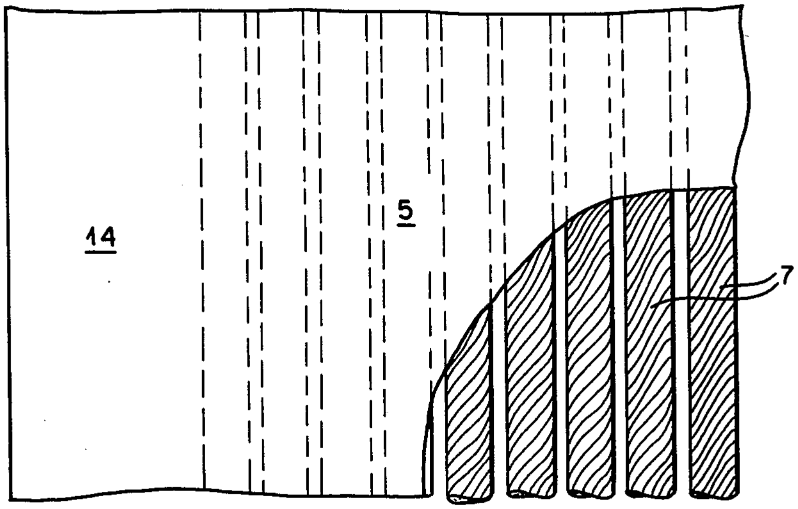
FIG. 7 is a partly broken away top view of the detail shown in FIG. 6.

As seen in FIGS. 6 and 7 the belt 5 is reinforced with a plurality of cords 7 formed as separate endless loops or separate turns of a single strand. They are formed as yarns, multifilament wires, or cables. They are imbedded in a matrix 5' of a synthetic-resin elastomer that bends easily.

Figure 8:
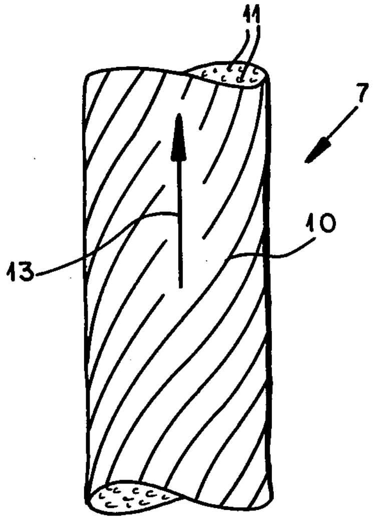
FIG. 8 is a large-scale top view of a detail of FIG. 8.
Figure 9:
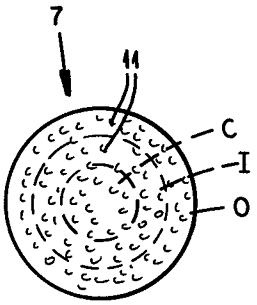
FIG. 9 is a cross section through the detail of FIG. 8.

FIG. 8 shows how a cord 7 has a twist 10 of about 10° relative to the longitudinal direction 13 of the strand. In addition FIG. 9 shows how it can be made of filaments 11 stabilized in a core C and in an outer region O with a binder, but unbound and even provided with a lubricant in an intermediate region I between them. Thus as the yarn bends its individual components can move relative to each other without friction.

Figure 10:
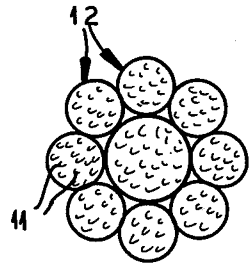
FIG. 10 is view like FIG. 9 through a variation on the detail of FIGS. 8 and 9.

In FIG. 10 the cord 7 is shown constituted as individual twisted strands or multifilament wires 12 formed like a cable.

FIG. 6 further illustrates how the edges 14 of the belt 5 are reinforced, and in fact the ends of the single strand forming the cords 7 are imbedded in these regions 14. In addition the belt 5 can incorporate transversely extending filaments 15 that are knitted or woven with the normally straight cords 7 and that serve to minimize transverse spreading of the belt. Furthermore one or both faces of the belt 5 can be bonded to a textile layer 16 that resists transverse spreading and makes these surfacs particularly hard.

The belt according to this invention bends easily but can still withstand enormous tension. Thus it very efficiently transforms tension into pressing force.

We claim:

1. A press for continuously compressing a web, the press comprising:
- a drum having a heated outer surface and rotatable about an axis;
- at least one endless belt radially juxtaposed with a portion of the outer drum surface and consisting mainly of
  - an elastically deformable matrix, and
  - a plurality of parallel, twisted, and generally annular multifilament cords axially spaced from one another and formed of yarns of an aromatic polyamide imbedded in the matrix;
- means for tensioning the belt and thereby urging it radially toward the drum-surface portion, whereby the belt and the drum-surface portion form an angularly extending pressing region;
- means for feeding the web to be compressed tangentially to one end of the pressing region and for withdrawing it from the other end thereof; and
- means for rotating the drum and thereby displacing the web and the belt angularly along the portion, whereby the web is compressed against and heated by the drum.

2. The belt-type press defined in claim 1 wherein the cords are cables.

3. The belt-type press defined in claim 2 wherein the cords have:
- a core formed of a plurality of filaments stabilized together by a binder;
- an unbound multifilament intermediate layer overlying the core; and
- an outer layer formed of a plurality of filaments stabilized together by a binder.

4. The belt-type press defined in claim 3 wherein the intermediate layer is provided with an interfilament lubricant.

5. The belt-type press defined in claim 2 wherein the yarns are formed of staple fibers and have a twist of about 40 turns per meter.

6. The belt-type press defined in claim 1 wherein the cords are cables with a twist of about 15 turns per meter.

7. The belt-type press defined in claim 1 wherein the cords are yarns.

8. The belt-type press defined in claim 1 wherein the cords are all twisted and in the same direction.

9. The belt-type press defined in claim 1 wherein the cords are generally of rectangular section and lie immediately adjacent one another.

10. The belt-type press defined in claim 1 wherein the aromatic polyamide is Kevlar.

11. The belt-type press defined in claim 1 wherein the cords are substantially straight and smooth and the belt further comprises connecting filaments tranverse to the cords and imbedded in the matrix.

12. The belt-type press defined in claim 1 wherein the cords are separate and endless.

13. The belt-type press defined in claim 1 wherein a single strand has a plurality of turns each constituting a respective cord.

14. The belt-type press defined in claim 1 wherein several layers of such cords are imbedded in the matrix.

15. The belt-type press defined in claim 1 wherein the belt has faces provided with textile coverings that resist transverse deformation.

16. The belt-type press defined in claim 1 wherein the belt has reinforced edges and is of greater rigidity at the edges than therebetween.

* * * * *